United States Patent
Hirata et al.

(10) Patent No.: US 6,210,513 B1
(45) Date of Patent: *Apr. 3, 2001

(54) METHOD FOR MANUFACTURING SOLID POLYMER ELECTROLYTE/ELECTRODE COMPOSITES, BATTERY PRODUCED USING THE METHOD AND METHOD FOR PRODUCING THE SAME

(75) Inventors: Motoyuki Hirata; Junji Yotsuyanagi, both of Kanagawa; Toshikazu Moriguchi, Tokyo, all of (JP)

(73) Assignee: Showa Denko K.K., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,572

(22) Filed: Jan. 28, 1998

Related U.S. Application Data

(60) Provisional application No. 60/056,267, filed on Aug. 29, 1997.

(51) Int. Cl.[7] .............................. B05D 5/12; B05D 3/00; B44C 1/165; H01M 4/00; B32B 3/26
(52) U.S. Cl. ..................... 156/230; 156/231; 156/247; 427/146; 427/294; 427/58; 428/304.4; 429/213
(58) Field of Search ............................. 427/79, 80, 146, 427/150, 113, 369, 376.6, 294, 295, 58; 156/230, 231, 242, 247, 289, 285; 428/304.4, 311.11, 312.2; 429/42, 191, 213

(56) References Cited

U.S. PATENT DOCUMENTS

| | | | |
|---|---|---|---|
| 4,313,972 | * | 2/1982 | Goller et al. .......................... 427/113 |
| 4,636,430 | * | 1/1987 | Moehwald ......................... 428/304.4 |
| 5,132,352 | * | 7/1992 | Richards et al. ..................... 524/403 |
| 5,489,491 | * | 2/1996 | Golovin ............................... 429/314 |
| 5,597,661 | * | 1/1997 | Takeuchi et al. ................ 252/500 X |

* cited by examiner

Primary Examiner—Richard Crispino
Assistant Examiner—J. A. Lorengo
(74) Attorney, Agent, or Firm—Sughrue, Mion, Zinn, Macpeak & Seas, PLLC

(57) ABSTRACT

Disclosed are a method for manufacturing a solid polymer electrolyte film/electrode composite, in which a porous electrode made from an electochemically active substance is used as an electrode and the pressure inside the porous electrode is reduced in order to fix the solid polymer electrolyte (SPE) film or pre-solid polymer electrolyte (pre-SPE) film to the porous electrode, a battery obtained by impregnating the electrode in the solid polymer electrolyte film/electrode composite with an electrolytic solution under reduced pressure and a method for producing such. The invention provides a thin, uniform film-shaped solid polymer electrolyte/electrode composite with ease. The battery fabricated with the composite is free of defects such as short, has high performance and, hence, is useful.

13 Claims, No Drawings

METHOD FOR MANUFACTURING SOLID POLYMER ELECTROLYTE/ELECTRODE COMPOSITES, BATTERY PRODUCED USING THE METHOD AND METHOD FOR PRODUCING THE SAME

CROSS REFERENCE TO RELATED APPLICATIONS

This application is an application filed under 35 U.S.C. §111(a) claiming benefit pursuant to 35 U.S.C. §119(e)(i) of the filing date of the Provisional Application 60/056,267, filed Aug. 29, 1997, pursuant to 35 USC §111(b).

BACKGROUND ART

The present invention relates to a method for manufacturing a composites of a solid polymer electrolyte and an electrode, and also relates to a battery produced using the manufacturing method and to a method for producing a battery using the manufacturing method.

DESCRIPTION OF THE RELATED ART

A solid polymer electrolyte (hereinafter sometimes abbreviated as "SPE") is a polymer substance containing an electrolyte salt which polymer substance exhibits high ionic conductivity in the solid state and development thereof is being driven for the purpose of the application to various sensors, fuel batteries, coming generation batteries, photoelectric cells and electrochromic elements.

In order to impart high ionic conductivity to SPE, lower glass transition temperatures are more advantageous. However, if such is the case, the film strength is reduced and the SPE film disadvantageously becomes difficult to handle industrially. While there has been proposed a method of adding an organic solvent to SPE, this incurs a reduction in the strength thereof and the handling of the SPE film becomes even more difficult.

Accordingly, in order to laminate SPE on an electrode, a method of coating an SPE prepolymer directly on the electrode surface and then curing the polymer by cross-linking might be considered promising. However, the coating method is disadvantageous in that the thickness of SPE layer is difficult to control and homogeneous thin films can be hardly obtained.

To cope with this, a method of forming SPE into a film and adhering the film to an electrode is being attempted.

However, this method has problems in that the SPE film is generally weak in the strength and difficult to adhere to the electrode without any breakage. Moreover, SPE film containing an electrolytic solution is highly hygroscopic and can be difficultly adhered to the electrode while maintaining its low water content.

SUMMARY OF THE INVENTION

Under these circumstances, the present invention has been made and the objects of the present invention are to provide a method for manufacturing a composite of a solid polymer electrolyte and an electrode which allows for fixation of a film comprising an SPE film or a film made from an SPE polymer containing no electrolyte (hereafter, abbreviated as pre-SPE) (in the present invention, the term "solid polymer electrolyte film" includes the both films above) to an electrode in a simple and easy manner and to provide a battery produced using such a manufacturing method and a method for producing a battery using the method.

As a result of extensive investigations, the present inventors have found that the above-described objects can be attained by fixing a solid polymer electrolyte film to a porous electrode while reducing the pressure inside the porous electrode, fabricating a battery, and then impregnating the electrode in a solution comprising an electrolyte salt having high hygroscopic property. The present invention has been accomplished based on these findings.

By the method for manufacturing a composite of a solid polymer electrolyte film and an electrode according to the present invention, there can easily be obtained a thin composite having a uniform thickness and the solid battery obtained with this composite is free of short or the like, has high performance and is useful.

That is, the present invention provides a method for manufacturing a solid polymer electrolyte film/electrode composite, the method comprising fixing a solid polymer electrolyte film to a porous electrode comprising an electrochemical active substance while reducing the pressure inside the porous electrode.

Also, the present invention provides a method for producing a battery, the method comprising impregnating the electrode of the solid polymer electrolyte film/electrode composite obtained by the method described above with an electrolytic solution under reduced pressure and a battery obtained by the method.

That is, the present invention relates to the method for manufacturing a solid polymer electrolyte film/electrode composites, to the method for producing a battery using the composites and to a battery produced by the production method as follows.

1) A method for manufacturing a composite of a solid polymer electrolyte film and a thin film-shaped electrode, comprising the steps of: providing a thin film-shaped porous electrode comprising an electrochemically active substance; and reducing the pressure inside the porous electrode.

2) A method for manufacturing a composite of a solid polymer electrolyte film and a thin film-shaped electrode, comprising the steps of: coating on an electrode surface of the thin film-shaped porous electrode a polymerizable compound which is converted to a solid polymer electrolyte or a pre-solid polymer electrolyte upon polymerization; and reducing the pressure inside the porous electrode after superposing the electrode surface coated with the polymerizable compound onto the solid polymer electrolyte film.

3) The method for manufacturing a composite of a solid polymer electrolyte film and a thin film-shaped electrode as described in 1) or 2) above, wherein the solid polymer electrolyte film has an ion conductivity at room temperature of $10^{-5}$ S/cm or more.

4) The method for manufacturing a composite of a solid polymer electrolyte film and a thin film-shaped electrode as described in any one of 1) to 3) above, wherein the solid polymer electrolyte film contains a cross-linking polymer having a urethane bond and an oxyalkylene group.

5) The method for manufacturing a composite of a solid polymer electrolyte film and a thin film-shaped electrode as described in 2) above, wherein the polymerizable compound coated on the electrode has a urethane bond and an oxyalkylene group.

6) The method for manufacturing a composite of a solid polymer electrolyte film and a thin film-shaped electrode as described in any one of 1) to 5) above, wherein the solid polymer electrolyte film is obtained by polymerizing a composition comprising a solvent having dissolved therein a polymerizable compound.

7) The method for manufacturing a composite of a solid polymer electrolyte film and a thin film-shaped electrode as described in any one of 1) to 5) above, wherein the solid polymer electrolyte film is obtained by polymerizing a composition comprising a solvent containing an electrolyte salt having dissolved therein a polymerizable compound.

8) A method for manufacturing a composite of a solid polymer electrolyte film and a thin film-shaped electrode, comprising the steps of: coating a polymerizable compound which converts to a solid polymer electrolyte or a pre-solid polymer electrolyte upon polymerization on an electrode surface of a laminate film comprising a film base material and a film-shaped porous electrode on the film base material; reducing the pressure inside the electrode after superposing the surface coated with the polymerizable compound onto the solid polymer electrolyte film; and peeling off the film base material.

9) The method for manufacturing a composite of a solid polymer electrolyte film and a thin film-shaped electrode, as described in 8) above, further comprising the step of polymerizing the polymerizable compound after the step of reducing the pressure inside the electrode.

10) The method for manufacturing a composite of a solid polymer electrolyte film and a thin film-shaped electrode, as described in 8) or 9) above, wherein the film base material has a metal or metal oxide coating, on which the film-shaped porous electrode is provided to form a laminate film.

11) A method for producing a battery, comprising the step of: providing a composite of a solid polymer electrolyte film and an electrode obtained by the method as described in any one of 1) to 10) above; and impregnating under reduced pressure the electrode in the composite with an electrolytic solution.

12) The method for producing a battery as described in 11) above, wherein the electrolytic solution comprises a polymerizable compound and an electrolyte salt and the polymerizable compound is polymerized to cure after the impregnation under reduced pressure.

13) A method for producing a battery, comprising the step of: providing a composite of a solid polymer electrolyte film containing no electrolyte salt and an electrode as described in 6) above; and impregnating the electrode of the composite with an electrolytic solution under reduced pressure.

14) The method for producing a battery as described in 13) above, wherein the electrolytic solution comprises a polymerizable compound and an electrolyte salt and the polymerizable compound is polymerized to cure after the impregnation under reduced pressure.

15) A method for producing a battery, comprising the step of: providing a composite of a solid polymer electrolyte film containing an electrolyte salt and an electrode as described in 7) above; and impregnating the electrode of the composite with an electrolytic solution which has a concentration of an electrolyte salt greater than a concentration at which the electrolytic solution has a maximum ion conductivity.

16) The method for producing a battery as described in 15) above, wherein the electrolytic solution comprises a polymerizable compound and an electrolyte salt and the polymerizable compound is polymerized to cure after the impregnation under reduced pressure.

17) A battery obtained by the method as described in any one of 11) to 16) above.

DETAILED DESCRIPTION

The porous electrode used in the present invention comprises an electrochemical active substance. Specific examples of the electrochemical active substance include metal oxides such as cobalt oxide, manganese oxide, vanadium oxide, nickel oxide and molybdenum oxide, metal sulfides such as molybdenum sulfide, titanium sulfide and vanadium sulfide, electrically conductive polymers such as polyaniline, polyacetylene and derivatives thereof, polyparaphenylene and a derivative thereof, polypyrrole and a derivative thereof, and polythienylene and a derivative thereof, and carbon materials such as natural graphite, artificial graphite, vapor phase processed graphite, petroleum coke, coal coke, graphite fluoride, pitch-base carbon and polyacene.

The SPE film or pre-SPE film used in the present invention is obtained by polymerizing a polymerizable compound-containing solution composition which contains a polymerizable compound and at least a solvent.

In the present invention, the polymerizable compound-containing solution composition for the SPE film which can be used includes a mixture of a solvent containing an electrolyte and a polymerizable compound, and preferably used is a polymerizable compound-containing solution composition for the pre-SPE that comprises a mixture of a solution containing no electrolyte and a polymerizable compound. This is because while the former provides a composite of a solid polymer electrolyte film and electrode only by polymerizing and fixing the film to the electrode, there occurs a problem due to the hygroscopic property of the electrolyte. In the case of the latter, the composite of a pre-SPE film and an electrode is fabricated and then the composite is impregnated with an electrolytic solution to give a composite of a solid polymer electrolyte film and electrode. This, however, causes no such problem and, hence, is advantageous.

The polymerization reaction of the polymerizable compound-containing solution composition can be performed using active light beams such as visible light, ultraviolet ray, electron beam, γ ray and X ray, as well as the thermal polymerization.

The polymerizable compound includes a functional monomer or oligomer having at least one hetero atom. Specific examples thereof include (meth)acrylic esters and di(meth)acrylic esters each having an oxyalkylene chain, such as ω-methyloligooxyethyl methacrylate; alkyl(meth) acrylates such as methyl methacrylate and n-butyl acrylate; (meth)acrylamide-base compounds such as acrylamide, methacrylamide, N,N-dimethylacrylamide, N,N-dimethylmethacrylamide, acryloylmorpholine, methacryloylmorpholine and N,N-dimethylaminopropyl (meth) acrylamide; N-vinylamide-base compounds such as N-vinylacetamide and N-vinylformamide; alkyl vinyl ethers such as ethyl vinyl ether; polyfunctional (meth)acrylates such as trimethylolpropane (meth)acrylate, pentaerythritol penta(meth)acrylate and dipentaerythritol hexa(meth) acrylate; and various urethane acrylate prepolymers such as phenylglycidyl ether acrylate hexamethylene diisocyanate urethane prepolymer, phenylglycidyl ether acrylate isophorone diisocyanate urethane prepolymer.

Further, a polymerizable compound which has polymerizable functional groups comprising a urethane bond and an oxyalkylene group, represented by the following formula can be used.

wherein $R^1$ represents hydrogen or an alkyl group, $R^2$ represents a divalent organic group containing an oxyalkylene group, which may have a linear, branched or cyclic structure and may contain an atom other than carbon, hydrogen and oxygen, X and Y each independently represents 0 or an integer of from 1 to 5, and Z represents 0 or an integer of from 1 to 10, provided that when X is 0 and Y is 0, Z is 0; ($CH_2$) and ($CH(CH_3)$) may be irregularly disposed; and $R^1$, $R^2$, the values of X, Y and Z in one unit may be independent from those in another unit within one molecule and do not have to be the same among units.

Specific examples of the compound represented by the formula above include ω-methyloligooxyethyl N-methacryloylcarbamate and ω-methyloligooxyethyl methacryloyloxyethylcarbamate. These polymerizable compounds may be used individually or in combination of two or more thereof.

Among the above-described polymerizable compounds, the compounds having an urethane bond and an oxyalkylene group are preferred, and examples thereof include oxyalkylene chain-containing urethane (meth)acrylate, urethane acrylate, oxyalkylene chain-containing (meth)acrylic ester and (meth)acrylamide-base compounds, with oxyalkylene chain-containing urethane (meth)acrylate being more preferred.

In order to obtain a cross-linked form of the polymer, at least one polyfunctional polymerizable compound can be used in combination as a copolymer component. Examples of the cross-linking polyfunctional compound which can be copolymerized include a diacrylate or dimethacrylate of polyalkylene glycol having a molecular weight of 1,000 or less (e.g., oligoethylene oxide, polyethylene oxide, oligopropylene oxide, polypropylene oxide), a diacrylate or dimethacrylate of linear, branched or cyclic alkylene glycol having from 2 to 20 carbon atoms (e.g., ethylene glycol, propylene glycol, trimethylene glycol, 1,4-butanediol, 1,5-pentanediol, 1,6-hexanediol, 1,7-heptanediol, 1,8-octanediol, 1,9-nonanediol, 1,10-decanediol, cyclohexane-1,4-diol), a polyfunctional acrylate or methacrylate compound resulting from displacing two or more OH groups of a linear, branched or cyclic polyhydric alcohol having 3 or more OH groups (e.g., glycerin, trimethylolpropane, pentaerythritol, sorbitol, glucose, mannitol), with an acryloyloxy group or a methacryloyloxy group, such as trimethylolpropane triacrylate (TMPTA), trimethylolpropane trimethacrylate (TMPTM), pentaerythritol triacrylate (PETA), pentaerythritol trimethacrylate (PETM), dipentaerythritol hexaacrylate (DPHA) and dipentaerythritol hexamethacrylate (DPHM), a polyfunctional acrylate compound having a molecular weight of 2,000 or less resulting from displacing two or more OH groups of the above-described polyhydric alcohol with an acryloyloxy-oligo (or poly) ethyleneoxy (or propyleneoxy) group, a polyfunctional methacrylate compound having a molecular weight of 2,000 or less resulting from displacing two or more OH groups of the above-described polyhydric alcohol with a methacryloyloxy-oligo (or poly) ethyleneoxy (or propyleneoxy) group, an aromatic urethane acrylate (or methacrylate) compound such as reaction product of tolylene diisocyanate with hydroxyalkyl acrylate (or methacrylate) (e.g., hydroxyethyl acrylate), an aliphatic urethane acrylate (or methacrylate) compound such as reaction product of an aliphatic diisocyanate (e.g., hexamethylene diisocyanate) with hydroxyalkyl acrylate (methacrylate) (e.g., hydroxyethyl methacrylate), a divinyl compound such as divinylbenzene, divinyl ether and divinylsulfone, and a diallyl compound such as diallyl phthalate and diallyl carbonate.

The SPE for use in the present invention usually has an ion conductivity of $10^{-5}$ S/cm or more, preferably from $5 \times 10^{-5}$ to $10^{-1}$ S/cm.

Examples of the electrolyte salt include $LiClO_4$, $LiBF_4$, $LiAsF_6$, $LiCF_3SO_3$, $LiPF_6$, $LiN(CF_3SO_3)_2$, LiI, LiBr, LiSCN, NaI, $Li_2B_{10}Cl_{10}$, $LiCF_3CO_2$, NaBr, NaSCN, KSCN, $MgCl_2$, $Mg(ClO_4)_2$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$ and $(n-C_5H_{11})_4NI$. Among these, a Li salt such as $LiBF_4$, $LiClO_4$ and $LiPF_6$, and a quaternary ammonium salt such as $(C_2H_5)_4NClO_4$ are preferred. The ratio of the electrolyte salt blended is generally from 0.1 to 70 parts by weight, preferably from 1 to 50 parts by weight, more preferably from 1 to 30 parts by weight, per 100 parts by weight of the polymerizable compound.

The solvent for the polymerizable compound-containing solution composition for use in the present invention include tetrahydrofuran, 2-methyltetrahydrofuran, 1,3-dioxolane, 4,4-dimethyl-1,3-dioxane, γ-butyrolactone, diethylcarbonate, dimethylcarbonate, methylethyl carbonate, ethylenecarbonate, propylene carbonate, butylene carbonate, sulfolane, 3-methylsulfolane, t-butyl ether, i-butyl ether, 1,2-dimethoxyethane, 1,2-diethoxymethoxyethane, methyldiglyme, methyltriglyme, methyltetraglyme, ethylglyme and ethyldiglyme. These may be used individually or in combination of two or more thereof.

To the polymerizable compound-containing solution composition may be added a polymerization initiator. Examples of the polymerization initiator include a radical thermal polymerization initiator such as azobisisobutyronitrile and benzoyl peroxide, a radical photopolymerization initiator such as benzyl methyl ketal and benzophenone, a cation polymerization catalyst such as a protonic acid (e.g., $CF_3COOH$) and a Lewis acid (e.g., $BF_3$, $AlCl_3$), and an anion polymerization catalyst such as butyl lithium, sodium naphthalene and lithium alkoxide.

In the present invention, there can be used a laminate film which comprises a base material and a film form porous electrode provided thereon. After a SPE film or pre-SPE film is fixed to the electrode surface of the laminate film, the base material is peeled off in the final step to fabricate an SPE/electrode composite.

The film base material used herein is not particularly limited and examples thereof include polyolefins such as polyethylene and polypropylene, and general thermoplastic resins such as polyvinyl chloride, polyester and polyamide. The film may be either non-stretched or stretched. The film base material generally has a thickness of from 1 to 5,000 μm, preferably from 1 to 1,000 μm, more preferably from 5 to 100 μm.

The laminate film for use in the present invention is obtained by laminating the above-described SPE or pre-SPE film on a film base material. The SPE is laminated by a known coating method such as a doctor knife method and then polymerized to cure by thermal polymerization or the like. Use of a thin film such as a metal or metal oxide formed by vapor deposition on the surface of the film base material is preferred in view of wettability and peelability. The SPE film of the laminate film usually has a thickness of from 1 to 1,000 μm, preferably from 1 to 300 μm, more preferably from 1 to 50 μm.

The method for manufacturing a solid polymer elecrtolyte film/electrode composite according to the present invention is featured by superposing a surface of SPE film or pre-SPE film of the laminate film onto a surface of the porous electrode and then reducing the pressure inside the porous electrode for fixation. The pressure is reduced, for example, by a method such that a porous electrode is placed on a gas permeable material such as sintered metal and the other surface side of the gas permeable material is decompressed by means of a vacuum pump.

The battery of the present invention is obtained by impregnating the solid polymer electrolyte film/electrode composite fabricated according to the above-described method with an electrolytic solution under reduced pressure.

As the electrolytic solution can be used a solution obtained by dissolving an electrolyte salt in a solvent. If desired, a solution containing the above-described polymerizable compound and polymerization initiator as well as the electrolyte salt may be used so that the electrolytic solution after the impregnation can be cured by the method described above such as thermal polymerization.

Taking account of the diffusion of the electrolyte salt into the SPE film layer or the pre-SPE film layer upon impregnation of the solid polymer elecrtolyte film with the electrolytic solution, the concentration is preferably set higher than the electrolyte concentration necessary for giving a maximum ion conductivity (in general, about 1 mol/l).

BEST MODE FOR CARRYING OUT THE INVENTION

The present invention is described in greater detail below by referring to examples. However, the present invention is not limited to the following examples.

EXAMPLE 1

To 100 parts by weight of Mixture A containing 33 wt % of a polymerizable compound shown below as a pre-SPE polymerizable compound-containing solution composition:

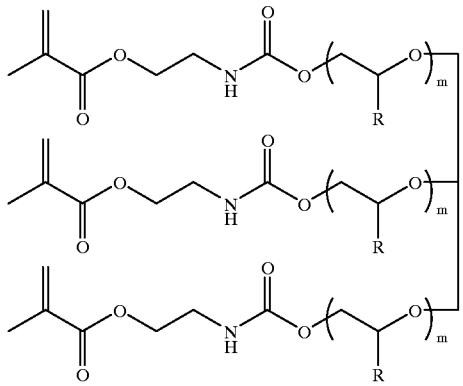

(wherein m is 25, R is hydrogen:methyl group=7:3 by mol) and 67 wt % of a solvent (a mixture of 75 wt % of ethylene carbonate and 25 wt % of propylene carbonate), 0.25 part by weight of a polymerization initiator (a mixture of 50% by weight of 1-hydroxycyclohexyl phenyl ketone and 50% by weight of benzophenone (trade name: Irgacure 500, produced by Ciba Geigy) was added to prepare a mixed solution.

A 12 $\mu$m-thick polyester film having evaporated alumina on one surface thereof was used as the film base material and the solution composition prepared above was coated on the alumina evaporated surface of the base material by means of a coater to have a thickness of 30 $\mu$m. Thereafter, ultraviolet rays were irradiated on the mixed solution composition thus coated to cure the solution composition by cross-linking, thereby obtaining a pre-SPE laminated film. A 30 $\mu$m-thick oriented polypropylene (OPP) film was superposed thereon to prepare a three-layer film.

An electrode having a size slightly smaller than the film base material and obtained by coating a mixture of natural graphite polymer with a binder of 3 wt % polyvinylidene fluoride (PVDF) on a 15 $\mu$m-thick copper foil to have a thickness of 85 $\mu$m, was used as the negative electrode. The electrode was placed on a 2 mm-thick stainless steel-made sintered plate, the surface from which the OPP film of the three-layer film had been removed was superposed thereon, and the back surface of the sintered plate was decompressed by means of a vacuum pump. The adhesion of the pre-SPE film to the electrode was confirmed and then, the polyester film was peeled off while continuing the decompression to fix only the pre-SPE film onto the electrode.

A positive electrode obtained by coating lithium cobalt (LiCoO$_2$) powder on a 25 $\mu$m-thick aluminum foil to have a thickness of 100 $\mu$m was superposed on the pre-SPE film described above in the same manner as above to fabricate a battery.

The battery thus fabricated was dipped in a solution obtained by adding 500 ppm of a thermal polymerization initiator (bis(4-t-butylcyclohexyl) peroxycarbonate, Perloyl TCP produced by Nippon Oils and Fats KK) to Mixed Solution B which was prepared by mixing a solvent (diethyl carbonate:ethylene carbonate=1:1) containing 10 parts by weight of LiClO$_4$ as an electrolyte salt per 100 parts by weight of the solvent, with the polymerizable compound prepared above at a mixing ratio of 6:1, and then impregnated therewith under reduced pressure by means of a vacuum pump. Thereafter, the battery impregnated was subjected to thermal polymerization at a temperature of 80° C. for 30 minutes to cure, thereby manufacturing a solid battery.

The battery (size: 2 cm×2 cm) obtained was charged and discharged repeatedly 10 times under conditions such that the working voltage was from 2.5 to 4.2 V and the electric current was 0.2 mA/cm$^2$. As a result, the maximum discharge capacity was 9.8 mAh.

Further, the battery was charged and discharged repeatedly 10 times at an electric current of 2 mA/cm$^2$ and then, the maximum discharge capacity was 8.9 mAh.

EXAMPLE 2

In the same manner as in Example 1 were prepared a three-layer film composed of a polyester film base material and a pre-SPE layer and an OPP layer laminated on the film base material and an electrode composed of a copper foil-graphite negative electrode and having a size slightly smaller than the film base material.

The electrode was placed on a stainless steel-made sintered plate while the OPP film was removed from the three-layer film. On an exposed SPE surface was coated Mixture A of Example 1 to a thickness of 5 $\mu$m. Then, the both members were superposed one on another so that the surface coated with Mixture A contacted the negative electrode surface. Then, the back surface of the sintered plate was decompressed using a vacuum pump. After confirming the adhesion of the pre-SPE film to the electrode, the resulting laminate was irradiated with ultraviolet rays from above the polyester film to cure Mixture A to completely adhere the pre-SPE film to the electrode. Subsequently, the polyester film was removed while continuing the decompressing, and only the pre-SPE film was fixed on the electrode.

On the electrode/pre-SPE composite thus obtained was superposed a positive electrode having the same structure as that in Example 1 and impregnated with the same polymerizable electrolytic solution as used in Example 1, followed by thermal polymerization for fixation to fabricate a solid battery.

The battery thus obtained was charged and discharged in the same manner as in Example 1 and then, the maximum discharge capacities were 9.5 mAh and 8.6 mAh, respectively.

EXAMPLE 3

A battery was manufactured in the same manner as in Example 1 except for using a mixed solution obtained by adding 10 parts by weight of $LiClO_4$ and 0.25 part by weight of Irgacure 500 to 100 parts by weight of Mixture A. The battery obtained was charged and discharged in the same manner as in Example 1 and then, the maximum discharge capacities were 9.9 mAh and 9.0 mAh, respectively.

COMPARATIVE EXAMPLE 1

In Example 2, decompression was not performed. As a result, the adhesive strength between the SPE layer and the electrode was weak and the SPE could not be adhered onto the electrode.

COMPARATIVE EXAMPLE 2

In Example 2, the electrolyte was coated to have a thickness of 30 μm and the decompression was not performed. As a result, on peeling off the polyester film, the negative electrode was readily peeled off together from the copper foil and adhering was difficultly achieved. A battery barely succeeded in the adhering was evaluated on the performance and then found to have inferior capability such that the maximum discharge capacities were 9.4 mAh and 4.8 mAh, respectively.

What is claimed is:

1. A method for manufacturing a composite of a solid polymer electrolyte film and a thin film-shaped porous electrode, comprising the steps of:

providing a solid polymer electrolyte film;

providing a thin film-shaped porous electrode comprising an electrochemically active substance;

contacting said solid polymer electrolyte film with said thin film-shaped porous electrode;

reducing the pressure inside the porous electrode to fix said solid polymer electrolyte film to said thin film-shaped porous electrode; and wherein the solid polymer electrolyte film has an ion conductivity at room temperature of $10^{-5}$ S/cm or more, and is obtained by polymerizing a composition comprising a solvent having dissolved therein a polymerizable compound.

2. A method for manufacturing a composite of a solid polymer electrolyte film having an ion conductivity at room temperature of $10^{-5}$ S/cm or more and a thin film-shaped electrode, comprising the steps of:

coating on an electrode surface of a thin film-shaped porous electrode a polymerizable compound which is converted to a solid polymer electrolyte or a pre-solid polymer electrolyte upon polymerization; and reducing the pressure inside the porous electrode after superposing the electrode surface coated with the polymerizable compound onto said polymer electrolyte film.

3. The method for manufacturing a composite of a solid polymer electrolyte film and a thin film-shaped electrode as claimed in claim 1 or 2, wherein said solid polymer electrolyte film contains a cross-linking polymer having a urethane bond and an oxyalkylene group.

4. The method for manufacturing a composite of a solid polymer electrolyte film and a thin film-shaped electrode as claimed in claim 2, wherein said polymerizable compound coated on the electrode has a urethane bond and an oxyalkylene group.

5. The method for manufacturing a composite of a solid polymer electrolyte film and a thin film-shaped electrode as claimed in claim 1 or 2, wherein said solid polymer electrolyte film is obtained by polymerizing a composition comprising a solvent containing an electrolyte salt having dissolved therein a polymerizable compound.

6. A method for manufacturing a composite of a solid polymer electrolyte film having an ion conductivity at room temperature of $10^{-5}$ S/cm or more and a thin film-shaped electrode, comprising the steps of:

coating a polymerizable compound which converts to a solid polymer electrolyte or a pre-solid polymer electrolyte upon polymerization on an electrode surface of a laminate film comprising a film base material having a metal or metal oxide coating;

reducing the pressure inside the porous electrode after superposing the surface coated with the polymerizable compound onto said solid polymer electrolyte film; and peeling off said film base material.

7. The method for manufacturing a composite of a solid polymer electrolyte film and a thin film-shaped electrode, as claimed in claim 6, further comprising the step of polymerizing the polymerizable compound after the step of reducing the pressure inside the electrode.

8. A method for producing a battery, comprising the steps of:

providing a composite of a solid polymer electrolyte film and an electrode obtained by the method as claimed in claim 1 or 2; and impregnating under reduced pressure the electrode in said composite with an electrolytic solution.

9. The method for producing a battery as claimed in claim 8, wherein the electrolytic solution comprises a polymerizable compound and an electrolyte salt and the polymerizable compound is polymerized to cure after the impregnation under reduced pressure.

10. A method for producing a battery, comprising the steps of:

providing a composite of a solid polymer electrolyte film containing no electrolyte salt and an electrode as claimed in claim 1; and impregnating the electrode of said composite with an electrolytic solution under reduced pressure.

11. The method for producing a battery as claimed in claim 10, wherein the electrolytic solution comprises a polymerizable compound and an electrolyte salt and the polymerizable compound is polymerized to cure after the impregnation under reduced pressure.

12. A method for producing a battery, comprising the steps of:

providing a composite of a solid polymer electrolyte film containing an electrolyte salt and an electrode as claimed in claim 5; and impregnating the electrode of said composite with an electrolytic solution which has a concentration of an electrolyte salt greater than a concentration at which the electrolytic solution has a maximum ion conductivity.

13. The method for producing a battery as claimed in claim 12, wherein the electrolytic solution comprises a polymerizable compound and an electrolyte salt and the polymerizable compound is polymerized to cure after the impregnation under reduced pressure.

* * * * *